(12) United States Patent
Gerle et al.

(10) Patent No.: US 6,846,336 B1
(45) Date of Patent: Jan. 25, 2005

(54) ACID-RESISTANT SOLUTIONS CONTAINING AROMATIC FORMALDEHYDE CONDENSATION PRODUCTS

(75) Inventors: Michael Gerle, Bergheim (DE); Klaus Walz, Gauting (DE); Hans Albert Ehlert, Singapore (SG); Ralf Heinen, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 192 days.

(21) Appl. No.: 10/129,535

(22) PCT Filed: Oct. 30, 2000

(86) PCT No.: PCT/EP00/10653

§ 371 (c)(1),
(2), (4) Date: May 7, 2002

(87) PCT Pub. No.: WO01/34898

PCT Pub. Date: May 17, 2001

(30) Foreign Application Priority Data

Nov. 10, 1999 (DE) ......................................... 199 54 013

(51) Int. Cl.$^7$ .................................................. D06P 1/56
(52) U.S. Cl. ............................... 8/561; 8/94.24; 8/673; 8/680; 8/588; 8/594; 8/924
(58) Field of Search ........................ 8/561, 94.24, 924, 8/673, 588, 594, 680

(56) References Cited

U.S. PATENT DOCUMENTS

| | | | |
|---|---|---|---|
| 2,899,261 A | * 8/1959 | Voorhies ......................... | 8/445 |
| 3,790,344 A | 2/1974 | Frickenhus et al. ............ | 8/165 |
| 3,844,712 A | * 10/1974 | Frickenhaus et al. .......... | 8/560 |
| 4,302,202 A | 11/1981 | Sumner et al. ................. | 8/455 |
| 4,355,996 A | * 10/1982 | Dilling et al. .................. | 8/561 |
| 4,883,839 A | * 11/1989 | Fitzgerald et al. .......... | 252/8.62 |
| 5,030,245 A | * 7/1991 | Hemling et al. ............... | 8/560 |

FOREIGN PATENT DOCUMENTS

| | | |
|---|---|---|
| DE | 3905083 | 8/1990 |

OTHER PUBLICATIONS

**Database WPI, Section Ch, Week 198921, Derwent Publications Ltd., London, GB; AN 1989–157418, XP002163394 & SU 1 435 671 A (Kaun Poly), Nov. 7, 1988 Zusammenfassung.

* cited by examiner

*Primary Examiner*—Margaret Einsmann
(74) *Attorney, Agent, or Firm*—Diderico van Eyl; Godfried R. Akorli

(57) ABSTRACT

The present invention relates to acid-resistant solutions containing aromatic formaldehyde condensation products having sulfonate and/or carboxylate groups, aliphatic carboxylic acids, aromatic sulfonic acids, and glycol ether solvents, to the preparation thereof, and to their use as leveling agents, dispersants or fastness improvers in textile finishing, as tanning agents for leather, and in the stain resist finishing of textile materials.

23 Claims, No Drawings

ACID-RESISTANT SOLUTIONS CONTAINING AROMATIC FORMALDEHYDE CONDENSATION PRODUCTS

BACKGROUND OF THE INVENTION

The present invention relates to acid-stable aqueous solutions containing aromatic formaldehyde condensation products containing sulfonate and/or carboxylate groups and suitable additives, to the preparation thereof and to their use as leveling agents, dispersants or fastness improvers in textile finishing, as tanning agents for leather and in the stain resist finishing of textile materials.

Water-soluble aromatic formaldehyde condensation products are known per se (see "Ullmanns Enzyklopädie der technischen Chemie" volume 16 (1979), page 140) and can be prepared by methods as described for example in Houben-Weyl: "Methoden der organischen Chemie" G. Thieme Verlag Stuttgart (1963), 14(2), 263–292, DE-A-1 960 616, DE-A-1 961 369 and DE 39 05 083 A1.

The aromatic formaldehyde condensation products described in DE-A-1 960 616 and DE 39 05 083 A1 are highly effective agents for improving the wetfastnesses of textiles dyed with anionic and/or cationic dyes. They can further be used for reserving polyamides against direct dyes in the dyeing of polyamide-cellulosic blends. The disadvantage of these products is the fact that they are not stable in the acidic pH range in that they separate out precipitates in the acidic pH range. There are many applications, however, where acid stability of the products themselves and after dilution in water is desirable for wide and universal utility. When further ionic groups are introduced into the products in order to improve acid stability, the effectiveness of the condensation products deteriorates.

It is an object of the present invention to provide acid-stable aqueous solutions of aromatic formaldehyde condensation products.

This object is achieved, surprisingly, by combining aromatic formaldehyde condensation products with suitable auxiliaries to obtain acid-stable aqueous solutions which are also highly effective in a wide range of applications in the textile and leather sectors.

SUMMARY OF THE INVENTION

The present invention accordingly provides an aqueous solution of a mixture containing
(A) 5–50% by weight of at least one aromatic formaldehyde condensation product containing sulfonate and/or carboxylate groups,
(B) 2–30% by weight of at least one aliphatic carboxylic acid,
(C) 1–20% by weight of at least one aromatic sulfonic acid and
(D) 1–15% by weight at least one solvent of the formula (1)

where $R^1$ and $R^2$ are independently H, straight-chain or branched $C_1$–$C_6$-alkyl, phenyl or $C_1$–$C_4$-acyl, $R^3$ is H or $CH_3$ and n is an integer from 1 to 10
and where the weight % ages indicated for the components (A) to (D) are each based on the entire aqueous solution.

DETAILED DESCRIPTION OF THE INVENTION

The mixtures according to the invention are notable for excellent stability to acid. Precipitations of the kind that occur with aqueous solutions of formaldehyde condensation products of the prior art represented in DE-A-1 960 616, DE-A1 961 369 and DE 39 05 083 A1 are not observed.

Preference is given to aqueous solutions of a mixture containing
(A) 5–50% by weight, preferably 10–40% by weight and especially 20–30% by weight of at least one aromatic formaldehyde condensation product containing sulfonate and/or carboxylate groups,
(B) 2–30% by weight, preferably 4–15% by weight and especially 5–10% by weight at least one aliphatic carboxylic acid,
(C) 1–20% by weight, preferably 2–10% by weight and especially 3–5% by weight of at least one aromatic sulfonic acid and
(D) 1–15% by weight, preferably 2–10% by weight and especially 3–7% by weight of at least one solvent of the formula (I)

where $R^1$ and $R^2$ are independently H, straight-chain or branched $C_1$–$C_6$-alkyl, phenyl or $C_1$–$C_4$-acyl, $R^3$ is H or $CH_3$ and n is an integer from 1 to 10
and where the weight % ages indicated for the components (A) to (D) are each based on the entire aqueous solution.

The formaldehyde condensation products (A), which contain sulfonate and/or carboxylate groups, are oligomeric or polymeric products which are obtainable by condensation of one or more condensation-capable aromatic and optionally non-aromatic compounds with formaldehyde, with the proviso that at least one of the aromatic compounds has to contain at least one sulfonate and/or carboxylate group or where the sulfonate groups are introduced during or after condensation. These formaldehyde condensation products containing sulfonate and/or carboxylate groups are soluble in water.

These formaldehyde condensation products can be prepared from a multiplicity of condensation-capable aromatic compounds, for example benzene and naphthalene derivatives, bearing one or more, preferably 1 or 2, substituents selected from the group consisting of $C_1$–$C_4$-alkyl, hydroxyl, $C_5$–$C_{11}$-cycloalkyl, $C_1$–$C_4$-alkoxy, $C_1$–$C_4$-hydroxyalkoxy, $C_6$–$C_{12}$-aroxy, $C_7$–$C_{13}$-aralkoxy, carboxyl, $C_1$–$C_6$-alkoxycarbonyl, sulfonate, $C_6$–$C_{12}$-arylsulfonyl and $C_6$–$C_{12}$-hydroxyarylsulfonyl.

Useful condensation-capable aromatic compounds include for example: xylene, mesitylene, phenol, cresols, xylenols, butylphenol, cyclohexylphenol, anisole, phenoxyethanol, phenoxypropanol, phenoxyacetic acid, phenolsulfonic acid, anisolesulfonic acid, diphenyl ether, ditolyl ether, 4,4'-dihydroxydiphenyl sulfone, 2,2-bis(4-hydroxyphenyl)propane, 4-hydroxydiphenyl sulfone, bis(hydroxyethoxyphenyl) sulfones, salicylic acid, 4-hydroxybenzoic acid, naphthalene, naphthols, isobutylnaphthalenes, naphtholsulfonic acids, naphthyl methyl ether, biphenylsulfonic acids and sulfonated 4,4'-dihydroxydiphenyl sulfone.

As well as aromatic condensation-capable compounds, nonaromatic condensation-capable compounds can additionally be used for preparing the formaldehyde condensation products, for example urea, thiourea, ethyleneurea, ethylenethiourea and/or melamine.

Preferred formaldehyde condensation products are those which are prepared by conjoint condensation of 4,4'-dihydroxydiphenol sulfone and phenolsulfonic acid and/or biphenylsulfonic acid and/or 4,4'-dihydroxybiphenylsulfonic acid and/or oxyditolylsulfonic acid and/or naphthalenesulfonic acids and/or hydroxybenzoic acids with formaldehyde.

Particularly preferred condensation products are obtained by conjoint condensation of a) 4,4'-dihydroxydiphenyl sulfone and b) phenolsulfonic acid with c) formaldehyde. In this conjoint condensation, a), b) and c) are used in a molar ratio of 1:(0.25–2.5):(0.75–3.5).

The formaldehyde condensation products to be used according to the invention can be prepared by reacting the condensation-capable aromatic and optionally nonaromatic compounds, with the proviso that at least one of the aromatic compounds contains at least one sulfonate and/or carboxylate group, with formaldehyde in an acidic or alkaline medium at temperatures of 100–200° C. to form relatively high molecular weight condensation products. The formaldehyde can be used in this reaction in the form of aqueous solutions or as paraformaldehyde. Instead of formaldehyde it is also possible to use compounds which release formaldehyde in situ, such as hexamethylenetetramine.

When the condensation-capable aromatic compounds do not already bear sulfonate groups as substituents, sulfonate groups can be introduced into the formaldehyde condensation products in a conventional manner, for example by reaction with sulfur trioxide, sulfuric acid, chlorosulfonic acid, amidosulfonic acid or reaction with formaldehyde and sulfites or bisulfites, before, during or after the condensation reaction.

It is further possible, as described in EP-A-0 474 075, to add agents having a reducing effect, during and/or after the condensation reaction. Customary reducing agents useful in chemical reactions can be used as agents having a reducing action. Representative examples are hydrogen, activated hydrogen, metal hydrides such as sodium hydride, sodium borohydride or lithium aluminohydride, reducing sulfur compounds such as sulfites, bisulfites, hydrosulfites, pyrosulfites, dithionites, thiosulfates, sulfoxylates, hydroxymethanesulfinates, sulfinates or thiourea dioxide, reducing phosphorus compounds such as phosphorous acid, hypophosphorous acid or salts thereof and also organic reducing agents such as glucose, gluconic acid or hydroxyacetone. Agents having a reducing action are used in amounts of 0.1–20% by weight and preferably 0.5–10% by weight, based on the ready-prepared condensation product.

Useful aliphatic carboxylic acids (B) include straight-chain or branched, saturated or unsaturated aliphatic carboxylic acids having one or more, preferably 1, 2, 3 or 4, carboxyl groups. These aliphatic carboxylic acids (B) can optionally be substituted by one or more, preferably 1 or 2, further functional groups, in which case these functional groups are selected from the group consisting of nitro, amino, hydroxyl, phosphono (—PO(OH)$_2$) and straight-chain or branched C$_1$–C$_4$-alkyl.

Representative examples are saturated C$_1$–C$_6$-, and preferably C$_1$–C$_3$-monocarboxylic acids such as formic acid, acetic acid or propionic acid. Particular preference is given to acetic acid.

Useful saturated dicarboxylic acids include oxalic acid, malonic acid, succinic acid, glutaric acid and adipic acid.

Useful unsaturated dicarboxylic acids include for example maleic acid or fumaric acid.

Useful substituted aliphatic mono-, di- or tricarboxylic acids include lactic acid, malic acid, tartaric acid or citric acid.

Useful saturated aliphatic tri- and tetracarboxylic acids include propanetricarboxylic acid and butanetetracarboxylic acid.

It is further possible to use nitrilotriacetic acid (NTA), ethylenediaminetetraacetic acid (EDTA), 1,2- or 1,3-propylenediaminetetraacetic acid, diethylenetriamine-N,N',N"-pentaacetic acid, N-hydroxyethylenediaminetriacetic acid, glycine-N,N-diacetic acid, asparagine-N,N-diacetic acid, ethylenediamine disuccinate, ethylenediamine monosuccinate or polyaminopolycarboxylic acids.

It is also possible to use phosphonocarboxylic acids, for example 2-phosphonobutane-1,2,4-tricarboxylic acid.

Useful aromatic sulfonic acids (C) include aromatic C$_6$–C$_{12}$-sulfonic acids having one or more, preferably 1 or 2, sulfonic acid groups. These aromatic sulfonic acids (C) can bear one or more, preferably 1 or 2, further substituents selected from the group consisting of amino, hydroxyl and C$_1$–C$_4$-alkyl. Representative examples include benzenesulfonic acid, toluenesulfonic acid, phenolsulfonic acid, aminobenzenesulfonic acid, naphthalenesulfonic acid and benzenedisulfonic acid. Particular preference is given to toluenesulfonic acid.

The aqueous solutions according to the invention contain 1–15% by weight, preferably 2–10% by weight and especially 3–7% by weight of at least one solvent of the formula (I)

$$R^1O(CH_2CHR^3O)_nR^2, \text{ (I)}$$

where $R^1$ and $R^2$ are independently H, straight-chain or branched C$_1$–C$_6$-alkyl, phenyl or C$_1$–C$_4$-acyl, $R^3$ is H or CH$_3$ and n is an integer from 1 to 10.

Preferably, $R^1$ and $R^2$ are independently hydrogen, methyl, ethyl, n-propyl, i-propyl, n-butyl, i-butyl, tert-butyl, n- or iso-pentyl, n- or iso-hexyl or acetate. $R^3$ is preferably CH$_3$. n is preferably 1, 2 or 3. Particularly preferably, $R^1$=H, $R^2$ and $R^3$ are each methyl and n=1.

Examples of useful solvents within the meaning of the formula (I) are the hereinbelow recited (poly)alkylene glycols, their mono- or dialkyl ethers, their mono- or diacyl esters and also their monoalkyl ether monoacyl esters:

polyethylene glycols such as ethylene glycol, diethylene glycol, triethylene glycol and higher ethylene glycols, ethylene glycol monoalkyl or -aryl ethers such as ethylene glycol monomethyl ether, ethylene glycol monoethyl ether, ethylene glycol monopropyl ether, ethylene glycol monobutyl ether, ethylene glycol mono-n-hexyl ether, ethylene glycol monophenyl ether, ethylene glycol dialkyl ethers such as ethylene glycol dimethyl ether, ethylene glycol diethyl ether, ethylene glycol dipropyl ether, ethylene glycol dibutyl ether, ethylene glycol mono- and -diacyl esters such as ethylene glycol monoacetate, ethylene glycol diacetate ethylene glycol monoalkyl ether monoacyl esters such as ethylene glycol monomethyl ether acetate, ethylene glycol monoethyl ether acetate, ethylene glycol monobutyl ether acetate, diethylene glycol monoalkyl ethers such as diethylene glycol monomethyl ether, diethylene glycol monoethyl ether, diethylene glycol monobutyl ether, diethylene glycol dialkyl ethers such as diethylene glycol dimethyl ether, diethylene glycol diethyl ether, diethylene glycol dibutyl ether, diethylene glycol monoalkyl monoacyl esters such as diethylene glycol monomethyl ether acetate, diethylene glycol monoethyl ether acetate, diethylene glycol monobutyl ether acetate, triethylene glycol monoalkyl ethers such as triethylene glycol monomethyl ether, triethylene glycol monoethyl ether, triethylene glycol monobutyl ether, triethylene glycol dialkyl ethers such as triethylene glycol dimethyl ether, (poly)propylene glycols such as propylene glycol, dipropylene glycol, tripropylene glycol and higher propylene glycols, (poly)propylene glycol monoalkyl ethers such as propylene glycol monomethyl ether, dipropylene glycol monomethyl ether.

Particular preference is given to using propylene glycol monomethyl ether.

As well as the components (A)–(D), the solutions according to the invention can optionally contain further auxiliaries.

Useful pH regulators include for example inorganic acids such as sulfuric acid, hydrochloric acid, phosphoric acid or nitric acid.

Useful auxiliaries further include surface-active substances and/or dispersants. Useful surface-active substances include for example alkylbenzenesulfonates having at least and preferably at least 9 carbon atoms in the alkyl chain, alkanesulfonates, olefinsulfonates, alkyl(aryl) polyalkylene glycol ether sulfonates, ester sulfonates, sulfosuccinates, castor oil sulfonates, alkyl sulfates, alkyl polyalkylene glycol ether sulfates, alkyl(aryl) polyalkylene glycol ether carboxylates, alkyl(aryl) phosphate esters, alkyl(aryl) polyalkylene glycol ether phosphate esters, glyceride sulfates, acylisethionates, acyltaurines, acylsarcosinates, alkyl(aryl) polyalkylene glycol ethers, tipped alkyl(aryl) polyalkylene glycol ethers, phenol polyalkylene glycol ethers, acylalkanolamide polyalkylene glycol ethers, alkoxylated butynediol derivatives, acyl polyalkylene glycol esters, alkylamine polyalkylene glycol ethers, ethylene oxide-propylene oxide block copolymers, alkylpolyglycosides, acylglucamides, (ethoxylated) sorbitan esters, quaternized alkylamines, alkylamine oxides, alkylbetaines, alkylamidobetaines, imidazolinium betaines or sulfobetaines.

Useful dispersants include for example: polyaspartic acids, n-alkylpolyaspartic acids, lignosulfonates, carboxymethylcelluloses, hydroxyethylcelluloses, hydroxypropylcelluloses, modified starches, polyacrylic acids, maleic acid-acrylic acid copolymers, maleic acid-olefin copolymers, polyvinyl alcohol, polyvinylpyrrolidone, vinylpyrrolidone-vinyl acetate copolymers, vinylpyrrolidone-vinylimidazole copolymers, vinylpyrrolidone-acrylate copolymers or vinylpyrrolidone-vinylcaprolactam copolymers.

The solutions according to the invention can also be admixed with the common textile-finishing standardizers such as urea or sodium sulfate.

The aqueous solutions according to the invention can have a water content of 0–90% by weight based on the entire aqueous solution. The water content is preferably 10–70% by weight and especially 30–60% by weight.

The aqueous solutions according to the invention are prepared by mixing the components (A) to (D), further auxiliaries (if used) and water in any desired order. In a preferred embodiment, component (A) is charged first and diluted with water. Components (D), (B) and (C) are then added in succession.

The aqueous solutions prepared according to the invention are useful in a wide variety of industrial sectors.

The invention further provides for the use of the aqueous solutions according to the invention as a leveling agent in the dyeing of fibers or textile materials produced therefrom. The aqueous solutions according to the invention are preferably employed in the dyeing of synthetic fibers or textile materials with anionic dyes. In this case, the aqueous solutions are added to the dyeing liquor of the anionic dyes.

The invention further provides for the use of the aqueous solutions according to the invention for improving the fastnesses of dyed fibers or textile materials produced therefrom. Under this use, the aqueous solutions according to the invention are employed for aftertreating anionically and/or cationically dyed fibers or textile materials produced therefrom, preferably polyamides, especially synthetic polyamides. This aftertreatment of dyed fibers or textile materials produced therefrom can be effected both by the padding process and by the exhaust process. The aqueous solution according to the invention is added to a rinse or further finishing bath after dyeing and leads to improved wetfastnesses for the dyeings on the dyed fibers or textile materials. The aqueous solutions according to the invention are useful in this context not only for aftertreating dyeings produced with anionic dyes, for example with azo, anthraquinone, triphenylmethane, azine, xanthene or nitro dyes, especially with the so-called acid wood dyes of the azo and anthraquinone series, but also for dyeings obtained with cationic dyes, for example with diphenylmethane, triphenylmethane, rhodamine, thiazine, oxazine, methine and azo dyes having a basic or quaternized amino group. Useful synthetic, anionically dyeable polyamides include especially polyhexamethylenediamineadipate (PA 6,6), poly-E-caprolactam (PA 6) and poly-ω-aminoundecanoic acid (PA 12). Useful cationically dyeable polyamides include the correspondingly anionically modified polyamides.

The invention further provides for the use of the aqueous solutions according to the invention in the stain resist finishing of textile materials, preferably of synthetic textile materials and especially of synthetic polyamide carpets. Under this use, the textile materials are treated with the aqueous solutions according to the invention after the dyeing operation.

The invention further provides for the use of the aqueous solutions according to the invention as tanning agents for leather.

The invention further provides for the use of the aqueous solutions according to the invention as a dispersant for water-insoluble solids, preferably for dyes, pigments or agrichemicals. Under this use, an aqueous dispersion or suspension of the water-insoluble solids is admixed with the aqueous solution according to the invention.

EXAMPLES

Example A1

28.15 kg of technical grade 4,4'-dihydroxydiphenyl sulfone, 16.74 kg of technical grade phenolsulfonic acid (65% in water), 15.39 kg of 30% aqueous sodium hydroxide solution and 27.53 kg of water are mixed in a pressure vessel at 80° C. After 12.19 kg of 30% formaldehyde solution have been added and the vessel has been sealed, the reaction mixture is heated to 120° C. and condensed for 5 hours with stirring. After cooling, a dark brown viscous product is obtained.

Example A2

29.78 kg of technical grade 4,4'-dihydroxydiphenyl sulfone, 15.93 kg of technical grade phenolsulfonic acid (65% in water), 15.40 kg of 30% aqueous sodium hydroxide solution and 26.47 kg of water are mixed in a pressure vessel at 80° C. After 12.41 kg of 30% formaldehyde solution have been added and the vessel has been sealed, the reaction mixture is heated to 120° C. and condensed for 5 hours with stirring. After cooling, a dark brown viscous product is obtained.

Example A3

30.69 kg of technical grade 4,4'-dihydroxydiphenyl sulfone, 14.95 kg of technical grade phenolsulfonic acid (65% in water), 14.68 kg of 30% aqueous sodium hydroxide solution and 27.28 kg of water are mixed in a pressure vessel at 80° C. After 12.41 kg of 30% formaldehyde solution have been added and the vessel has been sealed, the reaction mixture is heated to 120° C. and condensed for 5 hours with stirring. After cooling, a dark brown viscous product is obtained.

Example A4

32.74 kg of technical grade 4,4'-dihydroxydiphenyl sulfone, 12.00 kg of technical grade phenolsulfonic acid (65% in water), 13.92 kg of 30% aqueous sodium hydroxide solution and 29.10 kg of water are mixed in a pressure vessel at 80° C. After 12.24 kg of 30% formaldehyde solution have been added and the vessel has been sealed, the reaction mixture is heated to 120° C. and condensed for 5 hours with stirring. After cooling, a dark brown viscous product is obtained.

The products obtained according to examples A1–A4 separate out precipitates on adjustment to pH<5 with inorganic acids such as sulfuric acid or organic acids such as acetic acid and dilution with water. Thus, they are not acid-stable. For this reason, it is impossible to measure the fastness-improving effect of the products in the required acidic pH range. To gauge the effectiveness of the acid-stable products according to the invention, a non-acid-stable product is prepared with the same active content, albeit not adjusted to pH<5.

Example VB1 (Comparative)

59.80 kg of the product of example A4 are heated to 400° C. with stirring and admixed with 40.20 kg of water. The weakly alkaline product obtained is soluble in water, but not acid-stable.

To demonstrate the effectiveness of the subject combination of the components (A), (B), (C) and (D), comparative mixtures of the condensation product of example A4) with the combination of auxiliaries are prepared by omitting one or two components:

Example VB2 (Comparative)

59.80 kg of the product of example A4 are heated to 40° C. with stirring and admixed with 36.47 kg of water followed by 3.73 kg of toluenesulfonic acid. The product obtained separates out precipitates even before the toluenesulfonic acid has been added and therefore cannot be used for measuring the fastness-improving effect.

Example VB3 (Comparative)

59.80 kg of the product of example A4 are heated to 40° C. with stirring and admixed with 31.70 kg of water followed by 8.50 kg of glacial acetic acid. The product obtained separates out solid precipitates even before the glacial acetic acid has been added and therefore cannot be used for measuring the fastness-improving effect.

Example VB4 (Comparative)

59.80 kg of the product of example A4 are heated to 40° C. with stirring and admixed with 35.20 kg of water followed by 5.00 kg of 1-methoxy-2-propanol. The product obtained separates out precipitates even before the 1-methoxy-2-propanol has been added and therefore cannot be used for measuring the fastness-improving effect.

Example VB5 (Comparative)

59.80 kg of the product of example A4 are heated to 40° C. with stirring and admixed with 26.70 kg of water followed by 5.00 kg of 1-methoxy-2-propanol and 8.5 kg of glacial acetic acid. The product obtained separates out precipitates even before the 1-methoxy-2-propanol has been added and therefore cannot be used for measuring the fastness-improving effect.

Example VB6 (Comparative)

59.80 kg of the product of example A4 are heated to 40° C. with stirring and admixed with 31.47 kg of water, 5.00 kg of 1-methoxy-2-propanol and 3.73 kg of p-toluenesulfonic acid added in succession. The product obtained is soluble in water, but has a distinctly worse fastness-improving effect than the following products according to the invention (see following test of wetfastnesses).

Example B1

60.27 kg of the product of example A1 are heated to 40° C. with stirring and admixed with 24.30 kg of water, 3.60 kg of 1-methoxy-2-propanol, 7.13 kg of glacial acetic acid and 3.2 kg of p-toluenesulfonic acid added in succession. The product obtained is soluble in water.

Example B2

55.80 kg of the product of example A2 are heated to 40° C. with stirring and admixed with 29.57 kg of water, 3.60 kg of 1-methoxy-2-propanol, 6.60 kg of glacial acetic acid and 2.93 kg of p-toluenesulfonic acid added in succession. The product obtained is soluble in water.

Example B3

57.60 kg of the product of example A3 are heated to 40° C. with stirring and admixed with 28.00 kg of water, 3.60 kg of 1-methoxy-2-propanol, 6.43 kg of glacial acetic acid and 2.87 kg of p-toluenesulfonic acid added in succession. The product obtained is soluble in water.

Example B4

55.80 kg of the product of example A2 are heated to 40° C. with stirring and admixed with 26.30 kg of water, 510 kg of 1-methoxy-2-propanol, 8.87 kg of glacial acetic acid and 3.93 kg of p-toluenesulfonic acid added in succession. The product obtained is soluble in water.

Example B5

59.80 kg of the product of example A4 are heated to 40° C. with stirring and admixed with 11.37 kg of water, 5.10 kg of 1-methoxy-2-propanol, 16.43 kg of glacial acetic acid and 7.30 kg of p-toluenesulfonic acid added in succession. The product obtained is soluble in water.

Example B6

59.80 kg of the product of example A4 are heated to 40° C. with stirring and admixed with 22.97 kg of water, 5.00 kg of 1-methoxy-2-propanol, 8.50 kg of glacial acetic acid and 3.73 kg of p-toluenesulfonic acid added in succession. The product obtained is soluble in water.

Example B7

59.80 kg of the product of example A4 are heated to 40° C. with stirring and admixed with 11.42 kg of water, 5.00 kg of 1-methoxy-2-propanol, 8.50 kg of glacial acetic acid, 3.73 kg of p-toluenesulfonic acid and 11.55 kg of urea added in succession. The product obtained is soluble in water.

Example B8

60.00 kg of the product of example A4 are heated to 40° C. with stirring and admixed with 12.77 kg of water, 5.00 kg of 1-methoxy-2-propanol, 8.50 kg of glacial acetic acid, 10.00 kg of glutaric acid and 3.73 kg of p-toluenesulfonic acid added in succession. The product obtained is soluble in water.

Example B9

60.00 kg of the product of example A4 are heated to 40° C. with stirring and admixed with 12.77 kg of water, 5.00 kg of 1-methoxy-2-propanol, 8.50 kg of glacial acetic acid and 13.73 kg of p-toluenesulfonic acid added in succession. The product obtained forms a clear solution in water.

Example B10

60.00 kg of the product of example A4 are heated to 40° C. with stirring and admixed with 19.77 kg of water, 5.00 kg of 1-methoxy-2-propanol, 8.50 kg of glacial acetic acid, 1.00 kg of 98% sulfuric acid and 5.73 kg of p-toluenesulfonic acid added in succession. The product obtained is soluble in water.

Testing of Wetfastness Improvement:

The following test of wetfastness improvement, as well as on the products of examples B1–B10, can only be carried out on the products of examples VB1 and VB6 (of the comparative examples VB1 –VB6), since they—although not acid-stable—are at least soluble in water, whereas all other products of comparative examples VB2–VB5 separate out precipitates even in the course of the dissolving in water.

To determine the improved fastness level of dyeings on polyamide, each product, is applied to a polyamide material predyed with 1.2% of Telon® Blue K-GGL (commercial product of DyStar Textilfarben GmbH & Co. Deutschland KG) 200%. For this, the products are dissolved in water in the concentration reported in table 1. The polyamide material is then added and heated from 25° C. to 70–75° C. on a roller bath. After this treatment, the material is rinsed, dried and tested for alkaline perspiration fastness in accordance with German standard specification DIN 54019. The staining of adjacent PA material is evaluated via colorimetric measurements. The higher the fastness rating, the higher the fastness.

TABLE 1

| Aqueous solution of example | Concentration | Fastness rating |
|---|---|---|
| VB1 | 2% | 4.1 |
| VB1 | 3% | 4.7 |
| VB6 | 2% | 2.6 |
| VB6 | 3% | 3.0 |
| B1 | 2% | 4.0 |
| B1 | 3% | 4.8 |
| B2 | 2% | 4.5 |
| B2 | 3% | 4.8 |
| B3 | 2% | 4.6 |
| B3 | 3% | 4.8 |

TABLE 1-continued

| Aqueous solution of example | Concentration | Fastness rating |
|---|---|---|
| B4 | 2% | 3.3 |
| B4 | 3% | 4.3 |
| B5 | 2% | 4.2 |
| B5 | 3% | 4.8 |
| B6 | 2% | 4.2 |
| B6 | 3% | 4.8 |
| B7 | 2% | 4.4 |
| B7 | 3% | 4.9 |
| B8 | 2% | 4.1 |
| B8 | 3% | 4.6 |
| B9 | 2% | 4.0 |
| B9 | 3% | 4.6 |
| B10 | 2% | 3.1 |
| B10 | 3% | 3.9 |

What is claimed is:

1. An aqueous solution of a mixture containing
   (A) 5 to 50% by weight of at least one aromatic formaldehyde condensation product containing sulfonate and/or carboxylate groups,
   (B) 2 to 30% by weight of at least one aliphatic carboxylate acid,
   (C) 1 to 20% by weight of at least one aromatic sulfonic acid, and
   (D) 1 to 15% by weight of at least one solvent of the formula (I)

$$R^1O(CH_2CHR^3O)_n-R^2, \quad (I)$$

where $R^1$ and $R^2$ are independently H, straight-chain or branched $C_1$–$C_6$-alkyl, phenyl, or $C_1$–$C_4$-acyl, $R^3$ is H or $CH_3$ and n is an integer from 1 to 10, and where the weight percentages indicated for components (A) to (D) are each based on the entire aqueous solution.

2. An aqueous solution of a mixture according to claim 1 additionally containing auxiliaries.

3. An aqueous solution of a mixture according to claim 2 wherein the auxiliaries are pH regulators, surfactants, dispersants, textile-finishing standardizers, or mixtures thereof.

4. An aqueous solution of a mixture according to claim 1 containing
   (A) 10 to 40% by weight of at least one aromatic formaldehyde condensation product containing sulfonate and/or carboxylate groups,
   (B) 4 to 15% by weight of at least one aliphatic carboxylic acid,
   (C) 2 to 10% by weight of at least one aromatic sulfonic acid, and
   (D) 2 to 10% by weight of at least one solvent of the formula (I)

$$R^1O(CH_2CHR^3O)_n-R^2, \quad (I)$$

where $R^1$, $R^2$, $R^3$, and n are each as defined in claim 1, and where the weight percentages indicated for the components (A) to (0) are each based on the entire aqueous solution.

5. An aqueous solution according to claim 1 wherein the aromatic formaldehyde condensation product (A) is prepared from a condensation-capable aromatic compound that is a benzene and/or a naphthalene derivative bearing one or more substituents selected from the group consisting of $C_1$–$C_4$-alkyl, hydroxyl, $C_5$–$C_{12}$-cycloalkyl, $C_1$–$C_4$-alkoxy, $C_1$–$C_4$-hydroxyalkoxy, $C_6$–$C_{12}$-aroxy, $C_7$–$C_{13}$-aralkoxy, carboxyl, $C_1$–$C_6$-alkoxycarbonyl, sulfonate, $C_6$–$C_{12}$-arylsulfonyl, and $C_8$–$C_{12}$-hydroxyarylsulfonyl.

6. An aqueous solution according to claim 1 wherein the aromatic formaldehyde condensation product (A) is prepared by conjoint condensation of 4,4'-dihydroxydiphenol sulfone and phenolsulfonic acid, biphenylsulfonic acid, dihydroxybiphenylsulfonic acid, oxyditolylsulfonic acid, naphthalenesulfonic acid, hydroxybenzoic acid, or mixtures thereof with formaldehyde.

7. An aqueous solution according to claim 1 wherein the formaldehyde condensation product (A) is prepared by conjoint condensation of (a) 4,4'-dihydroxydiphenol sulfone and (b) phenolsulfonic acid with (c) formaldehyde in a molar ratio of (a):(b):(c) of 1:(0.25 to 2.5):(0.75 to 3.5).

8. An aqueous solution according to claim 1 wherein the aliphatic carboxylic acid (8) is a C1–C6-monocarboxylic acid.

9. An aqueous solution according to claim 1 wherein the aliphatic carboxylic acid (8) is acetic acid.

10. An aqueous solution according to claim 1 wherein the aromatic sulfonic add (C) is benzenesulfonic acid, toluenesulfonic acid, phenolsulfonic acid, aminobenzene-sulfonic acid, naphthalenesulfonic acid, or benzenedisulfonic acid.

11. An aqueous solution according to claim 1 wherein for the solvent (0), $R^1$ and $R^2$ are independently hydrogen, methyl, ethyl, n-propyl, i-propyl, n-butyl, butyl, tertbutyl, n-pentyl, isopentyl, n-hexyl, isohexyl, or acetyl, R3 is CH3, and n is 1, 2, or 3.

12. An aqueous solution according to claim 1 wherein for the solvent (0), $R^1$ is H, $R^2$ is methyl, $R^3$ is methyl, and n is 1.

13. A method comprising dyeing fibers or textile materials with a dye in the presence of a leveling agent, wherein the leveling agent is an aqueous solution according to claim 1.

14. A method according to claim 13 wherein the dye is an anionic dye.

15. A method of improving the fastness of dyed textile materials comprising treating a dyed textile material with an aqueous solution according to claim 1.

16. A method according to claim 15 wherein the textile material is an anionically and/or cationically dyed textile material.

17. A method according to claim 16 wherein the textile material is a polyamide.

18. A method comprising stain resist finishing a textile material in the presence of an auxiliary, wherein the auxiliary is an aqueous solution according to claim 1.

19. A method according to claim 18 wherein the textile material is a synthetic textile material.

20. A method according to claim 18 wherein the textile material is a synthetic polyamide carpet.

21. A method comprising applying an aqueous solution according to claim 1 as a tanning agent for leather.

22. A method comprising dispersing water-insoluble solids in the presence of an aqueous solution according to claim 1 as a dispersant.

23. A method according to claim 22 wherein the water-insoluble solids are dyes, pigments, or agrichemicals.

* * * * *